United States Patent Office

3,349,099
Patented Oct. 24, 1967

---

3,349,099
AMINOARYL-GUANYLHYDRAZONES
Adrian Marxer, Muttenz, Switzerland, assignor to Ciba Corporation, New York, N.Y., a corporation of Delaware
No Drawing. Original application Mar. 27, 1963, Ser. No. 268,474, now Patent No. 3,211,746, dated Oct. 12, 1965. Divided and this application Apr. 8, 1965, Ser. No. 446,716
Claims priority, application Switzerland, July 22, 1959, 76,060/59; June 2, 1960, 6,328/60; June 20, 1960, 6,988/60; Jan. 16, 1961, 463/61; Jan. 20, 1961, 757/61; Apr. 28, 1961, 4,986/61; Apr. 3, 1962, 4,080/62
8 Claims. (Cl. 260—326.14)

This is a divisional application of my application Ser. No. 268,474, filed Mar. 27, 1963 now U.S. Patent No. 3,211,746 which itself is a continuation-in-part of my application Ser. No. 113,634, filed May 31, 1961 (now abandoned) which is in turn a continuation-in-part of my application Ser. No. 41,494, filed July 8, 1960 (now abandoned).

This invention relates to new guanyl hydrazones of biguanido-arylcarbonyl compounds. More especially it concerns guanyl hydrazones of biguanido-arylketones and -aldehydes, and salts thereof. The new compounds are derived more especially from biguanido-aryl-lower alkyl ketones and from biguanido-aryl-aldehydes, the aryl radicals being advantageously phenyl radicals and the lower alkyl radicals being, for example, methyl, ethyl, propyl, butyl, pentyl or hexyl radicals. The new hydrazones may be further substituted e.g. at the nitrogen atoms, especially at the terminal nitrogen atoms, viz. by lower aliphatic hydrocarbon radicals, such as lower alkyl groups, e.g. methyl, ethyl, propyl or butyl, or at the aromatic ring, e.g. by lower alkyl radicals, e.g. methyl, ethyl, iso-propyl, propyl, butyl, tertiary butyl; by lower alkoxy groups, e.g. methoxy, ethoxy, propoxy, butoxy, methylene-dioxy; by lower alkylmercapto groups, e.g. methylmercapto or halogen atoms, such as chlorine, bromine or the pseudo-halogen trifluoromethyl.

The new hydrazones possess valuable pharmacological properties. Thus, they are active against protozoa and amoebae. They possess an especially good action against trypanosomes. Furthermore, they possess anti-inflammatory properties. They can therefore be used pharmacologically on animals or as medicaments, especially in the treatment of infectious diseases caused by trypanosomes. Especially valuable are compounds of the formula

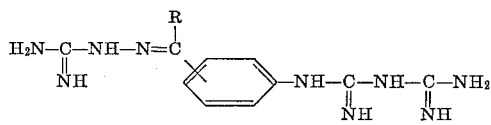

and above all those in which the biguanido group is in paraposition to the carbonyl-hydrazone grouping, in which formula R represents hydrogen or a lower alkyl radical, such as ethyl, propyl, butyl, pentyl, hexyl, and especially methyl, and salts thereof, but more especially the para-biguanido-acetophenone-guanyl-hydrazone and the para-biguanido-benzaldehyde guanyl-hydrazone and salts thereof.

The new compounds are made by methods in themselves known. Advantageously in an aryl biguanide, which contains in the aryl radical an acyl group, such as acetyl, propionyl, butyryl or oenanthoyl, this group is converted by reaction with a guanyl-hydrazine into the corresponding hydrazone.

For this purpose, the reactants are preferably used in the form of their salts.

According to another variant of the process, in a guanyl hydrazone of an arylcarbonyl compound, such as an aryl-ketone or -aldehyde, whose aryl radical contains an amino group which advantageously is in the form of a salt thereof, such group is converted into the biguanido group by reaction with a dicyanamide.

The aforesaid reactions are carried out by methods in themselves known, if desired, with the use of a diluent, at the ordinary or advantageously a raised temperature under atmospheric or superatmospheric pressure. The starting materials are known or can be prepared by per se conventional methods. The invention also comprises the new starting materials and their preparation. Biguanido-arylcarbonyl compounds and salts thereof are obtained by reaction of amino-arylcarbonyl compounds, preferably in the form of their salts, with dicyandiamides or by reaction of arylcarbonyl diazonium compounds with dicyandiamides and subsequent decomposition and reaction with ammonia or an amine.

The guanylhydrazones of aminoarylcarbonyl compounds and salts thereof are also new and have valuable properties. Especially valuable are the guanylhydrazones of the formula

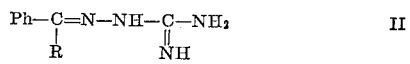   II where Ph represents a phenyl radical substituted in meta- or para-position by a free amino group, and R represents hydrogen or a lower alkyl radical, such as methyl, ethyl, propyl, isopropyl, or a straight or branched butyl, pentyl or hexyl radical which may be linked in any desired position—and their salts, which possess valuable pharmacological properties. Inter alia, for example, they counteract inflammations and can thus be used pharmacologically on animals or as medicaments, for example for treating inflammations.

Particularly valuable are the compounds of the formula

where Ph has the above meaning—and their salts.

The guanylhydrazones of aminoarylcarbonyl compounds and salts thereof can be obtained by reaction of aminoarylcarbonyl compounds or reactive carbonyl derivative thereof with an aminoguanidine, preferably in the form of a salt. Thus, for example, a compound of the formula

wherein Ph and R has the meaning given above may be reacted with guanylhydrazine. The reactants are preferably used in the form of their salts. According to another process for the manufacture of the guanylhydrazones of the aminoarylcarbonyl compounds in a guanylhydrazone of an arylcarbonyl compound in which the aryl radical contains a group convertible into a free amino group, such as a nitro, azo or acylamino group, said group is converted into the free amino group in the known manner. Thus for example in a compound of the formula

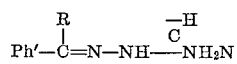

where R has the above meaning and Ph' represents a phenyl radical which contains in the meta- or para-position a nitro or azo group, such as an arylazo group, e.g. phenylazo, or an acylamino group, more especially a lower alkanoylamino group, such as acetylamino or a carbobenzoxy-amino group or a tritylamino group—said group is converted into a free amino group in the known manner by reduction or hydrolysis.

The reduction or hydrolysis respectively is performed in known manner and, of course, under conditions that prevent the guanylhydrazone grouping being attacked, thus the reduction, for example, with hydrogen in statu nascendi or with catalytically activated hydrogen, and the hydrolysis with a preferably alkaline hydrolysing agent such, for example, as an aqueous alkali or alkaline earth metal hydroxide.

The starting materials are known or can be made by methods known per se. For example, the starting materials of the formula

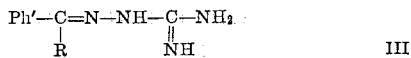    III where Ph′ and R have the above meanings—are obtained by the method described above when a compound of the formula

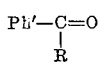

where Ph′ and R have the above meanings—is reacted with guanylhydrazine.

The invention also includes the starting materials which are new. It provides more especially the compounds of the formula

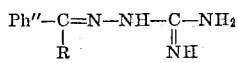

and their salts, where R has the meaning given above and Ph″ is a phenyl radical which contains in the meta- or para-position a lower alkanoylated amino group, such as a propionylamino, butyrylamino or valerylamino group or more especially an acetylamino group or a nitro group. These compounds display an anti-inflammatory effect and can thus be used pharmacologically on animals or as medicaments, for example for treating inflammations.

Depending on the conditions used the new compounds and the new starting materials are obtained as the free bases or in the form of salts thereof. As salts there may be mentioned more especially those of therapeutically useful acids, such as inorganic acids, for example, hydrohalic acids, for example, hydrochloric acid or hydrobromic acid, perchloric acid, nitric acid or thiocyanic acid, sulfuric or phosphoric acids, or organic acids, such as formic acid, acetic acid, propionic acid, glycollic acid, lactic acid, pyroracemic acid, oxalic acid, malonic acid, succinic acid, maleic acid, fumaric acid, malic acid, tartaric acid, citric acid, ascorbic acid, hydroxymaleic acid, dihydroxymaleic acid, benzoic acid, phenylacetic acid, or 4-aminobenzoic acid, 4-hydroxybenzoic acid, anthranilic acid, cinnamic acid, mandelic acid, salicylic acid, 4-aminosalicyclic acid, 2-phenoxybenzoic acid, 2-acetoxybenzoic acid, methane sulfonic acid, ethane sulfonic acid, hydroxy-ethane sulfonic acid, benzene sulfonic acid, para-toluene sulfonic acid, naphthalene sulfonic acid or sulfamic acids or methionine, tryptophane, lysine or arginine.

Salts so obtained can be converted by the usual methods into the free bases, and the free bases may be converted into salts thereof, for example, those mentioned above. The salts may thus be used in known manner for purifying the bases.

The new compounds are useful as medicaments, for example, in the form of pharmaceutical preparations which contain the compound or a salt thereof in admixture with a pharmaceutical organic or inorganic solid or liquid carrier suitable for enteral, parenteral or topical administration. For making the carriers there are used substances which do not react with the new compounds, for example, water, gelatine, lactose, starches, magnesium stearate, talc, vegetable oils, benzyl alcohols, gums, polyalkylene glycols, white petroleum jelly, cholesterol or other known carrier for medicaments. The pharmaceutical preparations may be, for example, in the form of tablets, dragees, salves or creams, or in liquid form as solutions, suspensions or emulsions. If desired they may be sterilized and/or may contain auxiliary substances such as preserving, stabilizing, wetting or emulsifying agents, salts for regulating the osmotic pressure or buffers. They may also contain other therapeutically valuable substances. The preparations can be made by the usual methods.

The invention also comprises groups of the biguanides and/or guanylhydrazones of this invention in which not all of the substituents that are mentioned or possible are present and/or any substituent present may be restricted in scope, or as the case may be, may be replaced by hydrogen.

The following examples illustrate the invention:

*Example 1*

32.8 grams of guanylhydrazine bicarbonate are suspended in 60 cc. of water and dissolved by slowly adding 38 cc. of 6.38 N-hydrochloric acid. 27.0 grams of para-aminoacetophenone and 150 cc. of methanol are then added and the mixture is heated for 1 hour on a water bath at 90° C. The solution is evaporated to dryness in vacuo and the residue is taken up in 100 cc. of ethanol. A small amount of insoluble matter is filtered off, and the filtrate is again evaporated in vacuo to half of its original volume. Yellowish crystals of para-aminoacetophenone guanylhydrazone hydrochloride of the formula

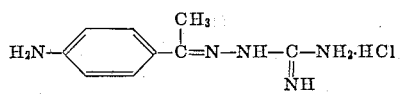

separate out which melt at 186–188° C. From the mother liquor constituents of lower melting point are obtained which, after having been crystallized from a small amount of water, likewise melt at 186–188° C.

*Example 2*

14.0 grams of guanylhydrazine bicarbonate are suspended in 30 cc. of water and dissolved by adding 16.75 cc. of 6.25 N-hydrochloric acid. The solution is treated with 13.5 grams of meta-aminoacetophenone and 75 cc. of methanol, and the mixture is rapidly heated on a water bath at 80° C. and allowed to reflux for 1 hour. The solution is then allowed to cool and filtered, whereupon crystallization sets in. Further product is obtained by concentrating the mother liquid under reduced pressure.

Recrystallization of the crystallizates from 8 times their own weight of water yields meta-aminoacetophenone guanylhydrazone hydrochloride of the formula

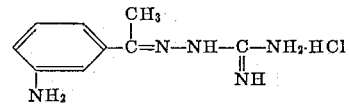

melting at 211–212° C.

*Example 3*

A solution of guanylhydrazine hydrochloride is prepared from 16.4 grams of guanylhydrazine bicarbonate, 30 cc. of water and 19.2 cc. of 6.25 N-hydrochloric acid. 16.32 grams of para-aminobutyrophenone and 75 cc. of methanol are then added to the solution prepared in this manner. The whole is rapidly heated on a water bath maintained at 80° C. and the solution is stirred for 1½ hours under reflux, cooled, a small amount of precipitated matter is filtered off, and the filtrate is evaporated to dryness. The residue is dissolved in 200 cc. of water and freed from residue of undissolved starting material. The guanylhydrazone is then precipitated in the form of the base with 100 cc. of 2 N-sodium hydroxide solution, the base is taken up in ether, and the ethereal solution is washed with water, and the ether is evaporated, to yield para-aminobutyrophenone guanylhydrazone of the formula

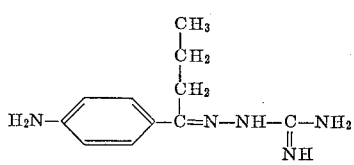

as an oily residue which crystallizes after some time, sinters at 122° C. and melts at 129–131° C.

When the base is dissolved in a small amount of ethanol, treated with 2 molecular proportions of alcoholic hydrochloric acid and ethyl acetate is added, the dihydrochloride, melting at 246–248° C. with decomposition, is obtained.

*Example 4*

35.45 grams of para-acetylaminoacetophenone are added to a solution of 32.8 grams of guanylhydrazine bicarbonate, 60 cc. of water and 38 cc. of 6.35 N-hydrochloric acid, and 150 cc. of methanol are added. The whole is stirred for 1½ hours at an external temperature of 85° C. to form a clear solution which is filtered and cooled. The crystals are isolated, and the mother liquor is concentrated in vacuo, whereby further crystalline material is obtained. After recrystallization from aqueous alcohol (45 parts of water+150 parts of alcohol) there is obtained para-acetylaminoacetophenone guanylhydrazone hydrochloride of the formula

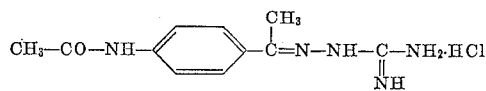

which melts at 263–264° C.

*Example 5*

32.8 grams of guanylhydrazine bicarbonate are suspended in 60 cc. of water and converted into the hydrochloride with 41.5 cc. of 5.92 N-hydrochloric acid. There are then added 24.2 grams of meta-aminobenzaldehyde (polymeric; 80% strength), together with 250 cc. of methanol, and the mixture is heated for 5 hours at the boil, after which time the bulk of the aldehyde has passed into solution. The whole is filtered hot, cooled, once more filtered, and the mother liquor is concentrated under vacuum to about 100 cc. The meta-aminobenzaldehyde guanylhydrazone hydrochloride crystallizes out; after 14 hours it is suctioned off and washed with methanol. It has the formula

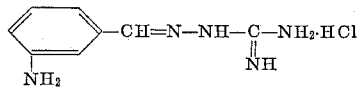

and melts at 133–135° C. after having sintered above 120° C.

*Example 6*

In the manner described in Example 5, 32.8 grams of guanylhydrazine bicarbonate in 60 cc. of water are converted into the hydrochloride with 41.5 cc. of 5.92 N-hydrochloric acid. The hydrochloride is then mixed with 24.2 grams of para-aminobenzaldehyde (polymeric; 93% strength), and 250 cc. of methanol, and the whole is stirred under reflux for 5 hours. A small amount of undissolved material and impurities is filtered off and the mother liquor is evaporated under vacuum. The residue is dissolved in 200 cc. of water, a small amount of undissolved material is filtered off, and the filtrate is once more evaporated to dryness. The crystalline evaporation residue is dissolved in 350 cc. of isopropanol, if necessary slightly concentrated, and the crystalline material (melting at 148–150° C.) is isolated; it consists of para-aminobenzaldehyde guanylhydrazone hydrochloride of the formula

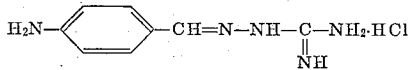

*Example 7*

13 grams of para-acetylaminoacetophenone guanyl-hydrazone hydrochloride are covered with 75 cc. of 4 N-sodium hydroxide solution and 75 cc. of ethanol, heated for 30 minutes at the boil and then cooled. The reaction solution is concentrated in vacuo to about 75 cc. and shaken with ether. On evaporation of the ether an oil is obtained which is shaken with 25 cc. of 2 N-alcoholic hydrochloric acid in 25 cc. of alcohol. After trituration with crystals of the product obtained in Example 1, the solidified constituents are isolated and recrystallized from a small amount of water, to yield the para-aminoacetophenone guanylhydrazone described in Example 1.

*Example 8*

From 33.03 grams of meta-nitroacetophenone there is prepared as described in Example 1 from guanylhydrazine bicarbonate and hydrochloric acid in the amounts specified in that example the meta-nitroacetophenone guanylhydrazone hydrochloride of the formula

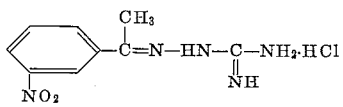

in the form of coarse yellowish crystals which are recrystallized from 5 times their own weight of water, whereupon a yellowish crystalline powder is obtained which melts at 237–239° C.

*Example 9*

12.9 grams of meta-nitroacetophenone guanylhydrazone hydrochloride are hydrogenated in 100 cc. of water with 6 grams of Raney nickel. When the calculated amount of hydrogen has been taken up, the whole is filtered and the filtrate concentrated under reduced pressure. The crystalline residue melts after recrystallization from water at 211–212° C. In admixture with the meta-aminoacetophenone guanylhydrazone hydrochloride described in Example 2 it shows no melting point depression.

*Example 10*

32.8 grams of guanylhydrazine bicarbonate are suspended in 60 cc. of water. By the addition of 39 cc. of 6.25 N-hydrochloric acid a solution of the hydrochloride is obtained. The solution is treated with 35.8 grams of meta-nitropropiophenone in 150 cc. of methanol with stirring, heated to the boil and kept at boiling temperature (water bath 80° C.) for 2 hours. The hot solution is filtered and cooled. Meta-nitropropiophenone guanylhydrazone hydrochloride of the formula

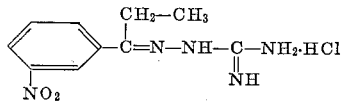

melting at 203° C. crystallizes out.

*Example 11*

In an analogous manner to that described in Example 9 from meta-nitropropiophenone guanylhydrazone hydrochloride there is obtained meta-aminopropiophenone guanylhydrazone hydrochloride of the formula

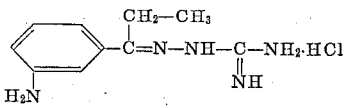

melting at 124–128° C.

*Example 12*

From 16.4 grams of guanylhydrazine bicarbonate, 30 cc. of water and 19.8 cc. of 6.25 N-hydrochloric acid a solution of guanylhydrazine hydrochloride is prepared. 14.93 grams of meta-aminopropiophenone in 75 cc. of methanol are added to the solution which is then heated on a water bath for 3 hours with stirring. The solution is filtered and concentrated to approximately 50 cc. The precipitated crystals of meta-aminopropiophenone-guanylhydrazone hydrochloride of the formula

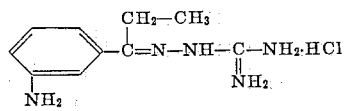

are isolated and washed with methanol. They melt at 124–128° C. From the mother liquor further quantities can be obtained.

Example 13

A solution of guanylhydrazine hydrochloride in water is prepared as described in Example 12, 14.92 grams of para-aminopropiophenone in 75 cc. of methanol are added. The mixture is stirred on a boiling water bath for 3 hours, filtered and evaporated under reduced pressure. The residue is dissolved with heating in 50 cc. of water. From the mother liquor para-aminopropiophenone guanylhydrazone hydrochloride of the formula

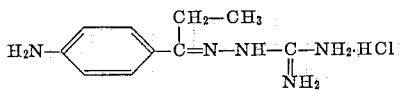

crystallizes gradually. The product melts at 100–103° C. after crystallization from water.

Example 14

8.2 grams of guanylhydrazine bicarbonate are suspended in 15 cc. of water and 10 cc. of 6 N-hydrochloric acid are added. The whole is heated until dissolution is complete and then cooled to room temperature. To the clear solution are added 12.8 grams of para-biguanido-acetophenone hydrochloride and the resulting suspension is diluted with 20 cc. of water. The whole is heated for one hour on a water bath at 80° C. Upon cooling only small amounts of para-biguanido-acetophenone-guanylhydrazone dihydrochloride precipitate out. The reaction mixture is then diluted with 100 cc. of water, and 30 cc. of nitric acid (specific gravity 1.38) are added in the cold. Soon copious crystallization of para-biguanido-acetophenone-guanyl hydrazone trinitrate takes place, which after recrystallization from a 1:2 mixture of water and methanol melts and decomposes at 189–191° C. The trinitrate has the formula

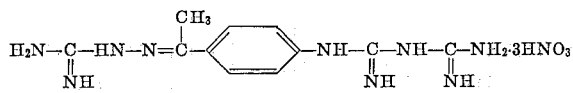

By adding a dilute solution of ammonia 1:3 to an aqueous solution of the trinitrate the dinitrate is obtained. It melts at 223–226° C. with decomposition.

On the other hand, when a 2 N-solution of caustic soda is added to an aqueous solution of the trinitrate the free base is precipitated. The latter melts at 213–215° C.

Other salts can be obtained from the free base, such as the dihydrochloride, sulfate, ditartrate and dimaleate.

Example 15

8.2 grams of guanylhydrazine bicarbonate are dissolved with 7.5 cc. of nitric acid (specific gravity 1.5) in 35 cc. of water. 10.9 grams of para-biguanido-acetophenone base in 50 cc. of methanol are added and the whole is stirred for 4 hours at room temperature. After about 20 minutes the crystallization of para-biguanido-acetophenone-guanylhydrazone trinitrate commences, and it is isolated, dissolved in 50 cc. of water and caused to crystallize with 100 cc. of 2 N-nitric acid. The mother liquor yields with 100 cc. of 2 N-nitric acid a further quantity of the trinitrate. It decomposes at 189–191° C. It is identical with the product obtained in Example 14.

Example 16

11.39 grams of para-aminoacetophenone-guanyl-hydrazone-hydrochloride are suspended in 30 cc. of water and treated with 8 cc. of 6.35 N-hydrochloric acid. By heating to about 70° C. a clear solution is obtained into which 4.2 grams of dicyandiamide are introduced. The reaction mass is then refluxed for 3 hours on an oil bath having a temperature of 130° C., then filtered, mixed with the same volume of methanol, and evaporated to dryness under reduced pressure. The residue is dissolved in 40 cc. of water and 80 cc. of methanol, and treated with 120 cc. of 2 N-nitric acid. The trinitrate of para-biguanido-acetophenone-guanyl-hydrazone which separates in crystalline form is isolated and washed with methanol. It melts at 189–190° C. and is identical with the product of example 14.

Example 17

8.2 grams of guanylhydrazine-bicarbonate are dissolved in 15 cc. of water and 10 cc. of 6.35 N-hydrochloric acid. The solution is treated with 14.2 grams of para-biguanido-butyrophenone and 20 cc. of water. On being heated to 75° C. on a water bath, the suspension passes into solution. Stirring is continued for 1 hour at that temperature. The solution is then filtered and evaporated to dryness under reduced pressure, the residue dissolved in a small quantity of alcohol, and the substance allowed to crystallize. It is isolated and washed with water to obtain the dihydrochloride of para - biguanido - butyrophenone-guanylhydrazone of melting point 246–248° C. It has the formula

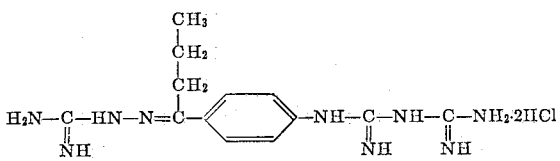

By dissolving 1 gram of this dihydrochloride in 5 cc. of water and 15 cc. of methanol and treating the solution with 25 cc. of 2 N-nitric acid, the trinitrate of melting point 237–238° C. can be obtained.

The para-biguanido-butyrophenone used is obtained in this manner: 32.6 grams of para-aminobutyrophenone are dissolved hot in 60 cc. of water and 31.6 cc. of 6.35 N-hydrochloric acid. There are added 16.8 grams of dicyandiamide, and the solution stirred for 5 hours on an oil bath of 130° C. The reaction mass is evaporated to dryness and recrystallized from 250 cc. of alcohol. The resulting para-biguanido-butyrophenone melts at 202–203° C.

Example 18

8.2 grams of guanylhydrazine-bicarbonate are suspended in 15 cc. of water and caused to dissolve with 10 cc. of 6.3 N-hydrochloric acid. After that, 12.8 grams of meta-biguanido-acetophenone hydrochloride are added together with 20 cc. of water. The mixture is heated to produce a homogeneous solution which is then stirred for 1 hour on a water bath of 75° C. On cooling, crystals separate and are recrystallized from 70% alcohol. The resulting metabiguanido-acetophenone - guanyl hydrazone-dihydrochloride melts at 271–274° C. It has the formula

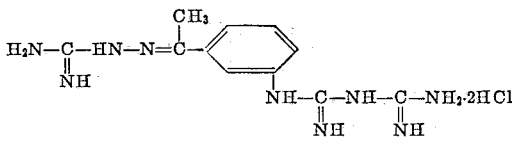

From the aqueous-methanolic solution of the dihydrochloride, there can be obtained with 2 N-nitric acid the trinitrate which melts and decomposes at 162–165° C.

The meta-biguanido-acetophenone-hydrochloride used as above can be obtained in this manner: 27 g. of meta-aminoacetophenone are dissolved in 60 cc. of water and 31.6 cc. of 6.35 N-hydrochloric acid and mixed at 70° C. with 16.8 grams of dicyandiamide. The solution is heated for 5 hours in an oil bath of 130° C., evaporated to dryness, and crystallized from alcohol of 95% strength. Melting point 212–213° C.

*Example 19*

In a manner analogous to Example 16, there can be obtained from meta - aminoacetophenone - guanylhydrazone-hydrochloride with hydrochloric acid and dicyandiamide the meta-biguanido-acetophenone-guanyl hydrazone as trinitrate, which is identical with the trinitrate of Example 18.

*Example 20*

8.2 grams of guanylhydrazine-bicarbonate are dissolved in 15 cc. of water and 10 cc. of 6.35 N-hydrochloric acid. 16.39 grams of para-biguanido-enanthophenone, 20 cc. of water and 10 cc. of alcohol are added and the mixture heated and stirred on the boiling water bath until dissolution is complete. The solution is kept on the water bath of 85° C. for another hour, then filtered and the filtrate cooled with ice. The crystals which precipitate are the para-biguanido-enanthophenone-guanylhydrazone - dihydrochloride of the formula

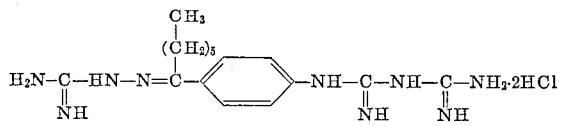

which after crystallization from water melts at 169–172° C.

From the aqueous solution of the dihydrochloride the dinitrate is precipitated with 30% sodium nitrate solution which after being redissolved from water melts at 139° C. With excess dilute nitric acid the trinitrate of melting point 154–157° C. (decomposition) is obtained.

The starting material is obtained as follows: By mixing 73 grams of acetanilide, 204 grams of enanthic acid chloride, 290 cc. of carbon disulfide, and adding 200 grams of aluminum chloride at 20–30° C. followed by boiling for 24 hours, isolating the reaction product and saponifying it with alcoholic potassium hydroxide, the para-amino-enanthophenone is obtained which after being redissolved from benzene petroleum ether melts at 91–92° C.

41.06 grams of para-amino-enanthophenone, dissolved in 60 cc. of water and 31.6 cc. of 6.35 N-hydrochloric acid are refluxed and stirred for 4 hours with 16.8 grams of dicyandiamide. 200 cc. of alcohol are added, the mixture cooled, and the precipitated crystals isolated. They consist of para-biguanido-enanthophenone-hydrochloride and after being redissolved from alcohol melt at 203–206° C.

*Example 21*

A solution of 21.37 grams of meta-aminobenzaldehyde guanylhydrazone hydrochloride in 50 cc. of water is mixed with 18 cc. of 5.92 N-hydrochloric acid. 8.5 grams of dicyandiamide are then added and the batch is heated in an oil bath for 3 hours at 100° C., then cooled, filtered, and the filtrate is evaporated to dryness under vacuum, the residue is dissolved in alcohol and the whole is once more evaporated to dryness. The crystalline residue is suctioned off with a small amount of alcohol and then extracted by being boiled with 300 cc. of alcohol. The insoluble material is isolated and dried; it is the metabiguanidobenzaldehyde guanylhydrazone dihydrochloride of the formula

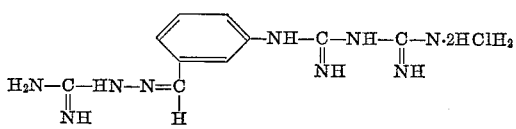

melting at 246–250° C. with decomposition.

*Example 22*

21.37 grams of para-aminobenzaldehyde guanylhydrazone hydrochloride are dissolved in 50 cc. of water, mixed with 18 cc. of 5.92 N-hydrochloric acid and 8.5 grams or dicyandiamide are then added. The resulting solution is stirred under reflux for 3 hours, then filtered, evaporated to dryness under vacuum, the residue is taken up in absolute alcohol and the whole is once more evaporated. The crystalline residue is transferred with a small amount of absolute alcohol to a suction filter and then extracted by being boiled with 200 cc. of alcohol. The undissolved residue contains the para-biguanidobenzaldehyde guanylhydrazone dihydrochloride of the formula

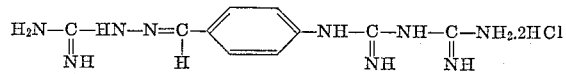

melting at 204–206° C.

What is claimed is:

1. A member selected from the group consisting of compounds of the formula

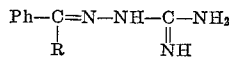

wherein Ph represents a member selected from the group consisting of meta-aminophenyl and para-aminophenyl and R stands for a member selected from the group consisting of hydrogen and lower alkyl, and their salts.

2. A member selected from the group consisting of meta-aminoacetophenone-guanylhydrazone and its salts.

3. A member selected from the group consisting of para-aminoacetophenone-guanylhydrazone and its salts.

4. A member selected from the group consisting of para-aminobutyrophenone-guanylhydrazone and its salts.

5. A member selected from the group consisting of para-aminopropiophenone-guanylhydrazone and its salts.

6. A member selected from the group consisting of meta-aminopropiophenone-guanylhydrazone and its salts.

7. A member selected from the group consisting of meta-aminobenzaldehyde-guanylhydrazone and its salts.

8. A member selected from the group consisting of para-aminobenzaldehyde-guanylhydrazone and its salts.

References Cited

UNITED STATES PATENTS

| | | | |
|---|---|---|---|
| 1,784,442 | 12/1930 | Heuser | 260—565 |
| 1,915,922 | 6/1933 | Christmann et al. | 260—565 |
| 2,221,333 | 11/1940 | Sibley | 260—565 |
| 2,223,935 | 12/1940 | Daniels et al. | 260—501 |
| 2,353,690 | 7/1944 | Clarkson et al. | 260—564 |
| 2,510,081 | 6/1950 | Curd et al. | 260—565 |
| 2,655,538 | 10/1953 | Jensch | 260—564 |
| 2,655,540 | 10/1953 | Jensch | 260—565 |
| 2,744,138 | 5/1956 | Marco et al. | 260—565 |
| 2,768,204 | 10/1956 | Hechenbleikner | 260—564 |
| 2,815,377 | 12/1957 | Meiser et al. | 260—564 |
| 3,014,072 | 12/1961 | Gardner et al. | 260—562 |
| 3,055,938 | 9/1962 | Remy | 260—562 |
| 3,105,849 | 10/1963 | Huebner | 260—501 |

FOREIGN PATENTS 190,941   7/1957   Austria.

OTHER REFERENCES

Conrad et al.: "Journal American Chemical Society," vol. 55, pp. 2867–70 (1933).

Tago et al.: "Chemical Abstracts," vol. 49, pp. 3411–12 (1955).

CHARLES B. PARKER, *Primary Examiner.*

WALTER A. MODANCE, *Examiner.*

N. TROUSOF, R. V. HINES, *Assistant Examiners.*